No. 662,793.  
R. G. KENNEDY.  
MOWER KNIFE GRINDER.  
(Application filed June 7, 1900.)  
Patented Nov. 27, 1900.

(No Model.)  
2 Sheets—Sheet 1.

Witnesses:  
E. E. Duffy

Inventor  
Richard G. Kennedy  
per ⎯⎯⎯ Attorney

No. 662,793. Patented Nov. 27, 1900.
R. G. KENNEDY.
MOWER KNIFE GRINDER.
(Application filed June 7, 1900.)
(No Model.) 2 Sheets—Sheet 2.
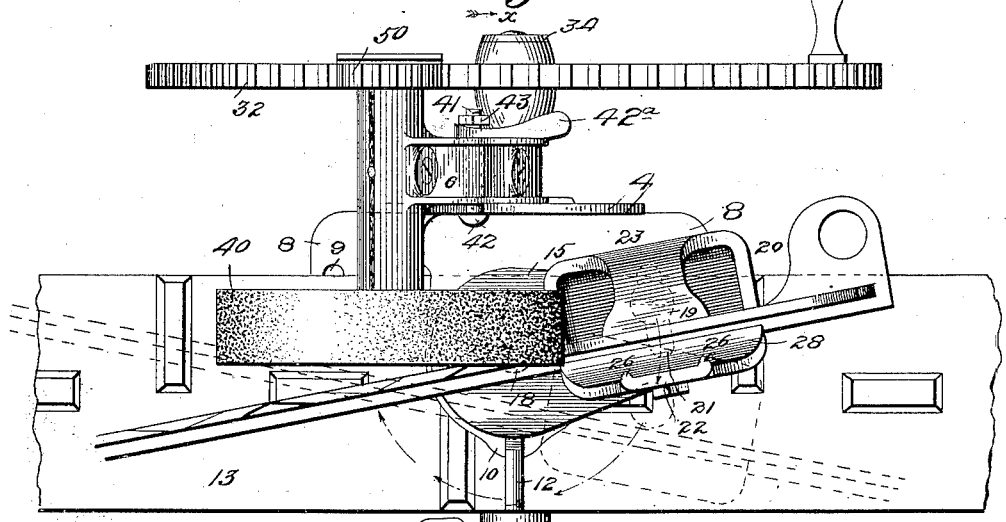
Witnesses
E. C. Duffy
Inventor
Richard G. Kennedy
per [signature] Attorney

UNITED STATES PATENT OFFICE.

RICHARD G. KENNEDY, OF PITTSBURG, PENNSYLVANIA.

MOWER-KNIFE GRINDER.

SPECIFICATION forming part of Letters Patent No. 662,793, dated November 27, 1900.

Application filed June 7, 1900. Serial No. 19,389. (No model.)

*To all whom it may concern:*

Be it known that I, RICHARD G. KENNEDY, a citizen of the United States, residing at Pittsburg, in the county of Allegheny and State of Pennsylvania, have invented certain new and useful Improvements in Mower-Knife Grinders; and I do hereby declare the following to be a full, clear, and exact description of the invention, such as will enable others skilled in the art to which it appertains to make and use the same.

My invention relates to edge-tool grinders, but more particularly to that class commonly known as "mower and reaper knife grinders," and has for one object to provide a portable grinder of the above-named class which can be readily attached to the wheel of a mower or reaper for the purpose of grinding the knife or which may be permanently attached to a table, bench, or the like in a manner which will hereinafter be explained.

A further object of my invention is to provide a mower and reaper knife grinder whereby the last or end sections of the knife can be ground as easily and as perfectly as the central sections, the length or size of the knife-head being immaterial.

My invention also consists in certain other novel features which will be hereinafter more fully described, and afterward specifically pointed out in the appended claims.

Figure 1:
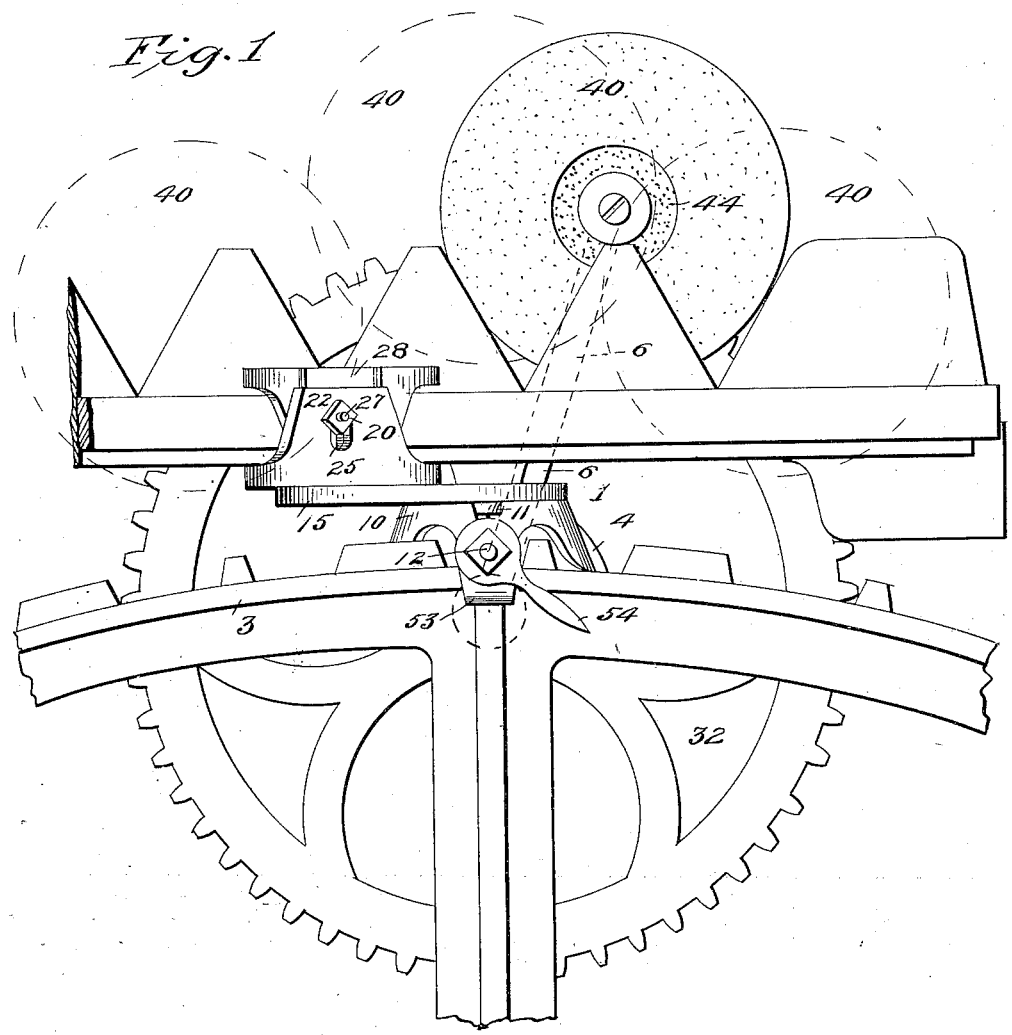
Figure 6:
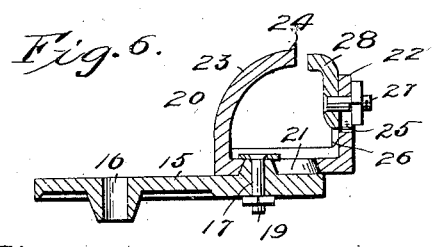

Referring to the accompanying drawings, Figure 1 is an elevation of my grinder in an operative position attached to a section of a mower-wheel, the knife being broken away. Fig. 2 is a top plan view of the same. Fig. 3 is a sectional view taken on the lines X X of Fig. 2. Fig. 4 is a sectional view of the emery-wheel and means of securing same. Fig. 5 is a perspective view of one-half the standard-arm casting. Fig. 6 is a sectional view of the knife-holder and swivel-plate.

The same numerals of reference indicate like parts throughout the several figures, in which—

1 indicates the base of the grinder, forming the horizontal bed-plate 2 and the vertical wall 3, said wall projecting above the bed-plate to form the arced or segmental flange 4. The wall 3 is provided with an opening 5 to form a bearing for the split standard 6. The base 1 is also provided with two arms 8, said plates having screw-holes 9 for the purpose of securing the grinder to a bench, table, or the like. The oblique side wall 10 is provided with a slot 11 to receive the bolt 12. The base 1 is cut away above the arms 8, as shown in Fig. 3, in order to accommodate the rim 13 of a mower-wheel. The manner of fastening the grinder thereto will be hereinafter more fully described.

The bed-plate 2 is provided with a central tapering opening 14. The swivel-plate 15 is substantially elliptical in form and is provided with two openings 16 and 17. The opening 16, which forms a bearing for the pin or bolt 18, is deeper than the body of the swivel-plate, the tapering wall being adapted to set down into the opening 14 of the bed-plate 2. The opening 17 in the swivel-plate is for the purpose of carrying the pin or bolt 19 and forms a boss 17ª on the face of the swivel-plate to act as a bearing for the knife-holder, Fig. 6.

The knife-holder 20, substantially rectangular in form, rests upon the swivel-plate 15 and is provided with a transverse slot 21, whereby the knife-holder 20 is capable of a sliding motion on the boss or bearing 17ª.

The knife-holder 20 has a vertical side 22 and an inwardly-curved side 23, said curved side having a flange at its top. The vertical side 22 of the knife-holder 20 has a central vertical slot 25 and two vertical pointed projections 26. A small bolt or pin 27 holds the adjustable clip 28 to the vertical side 22, said bolt or pin being raised or lowered in the slot 25. The clip 28 is provided at its back with two vertical angular recesses which register with the projections 26 on the vertical side 22, thus insuring to the clip a perfectly steady and upright position. The knife-holder 20 is sufficiently large to admit the head of the knife to enter, and clip 28 can be adjusted so as to accommodate long or short heeled sections.

The standard-arm 6 is cast in two sections. Said standard is provided with the bolt-openings 29 and the transverse opening 30. The bottom of the standard is formed into a hollow tapering bearing 31 for the large gear-wheel 32. A bolt 33, having a washer 34 between its head and the wheel 32, passes through the hollow bearing 31. The projection 7 opposite the bearing 31 enters the opening 5 in the vertical wall 3 of the base 1. A washer 35 and nut 36 hold the standard-arm securely to the base and the gear-wheel 32 on its bearing 31.

A small strip of felt or blotting-paper 31ª is placed between the two sections of the standard 6 in order to cushion them and keep the oil from running down between the two. At the top of the standard 6 is a journal 38, which carries the spindle 39 of the emery-wheel 40, the journal 38 and bearing 31 having suitable lubricating-inlets. A bolt 41 is held in the transverse opening 30 in the standard 6, its head 42 engaging the arced flange 4 of the base 1, Fig. 2. A cam-lever 42 is arranged between the nut 43 and the standard 6, whereby the bolt-head 42 can be drawn tightly against the flange 4, thus securely holding the standard.

The emery-wheel 40 is provided on both faces with a circular recess 44 and a central opening 45. A flat-headed bolt 46 passes through the opening 45, and a washer 47 is placed between the bolt-head and the emery-wheel. A retaining-washer 48 is placed within the inner circular recess 44 and bears against the emery-wheel. The retaining-washer 48 is recessed in its inner face to hold the spindle 39 and is provided therein with two projecting nibs 49. The hollow spindle 39 is provided with corresponding notches which register with this nib 49, thus making a rigid connection between the retaining-washer 48 and the spindle 39. The small gear wheel or pinion 50 is also recessed in its inner face to hold the other end of spindle 39 and is also provided therein with projecting nibs 51, which register with corresponding notches in the spindle 39, thus making a rigid connection between the wheel 50 and the spindle 39.

When the nut 52 is threaded snugly on the bolt 46, it presses the retaining-washer against the inner face of the emery-wheel 40 and pulls the washer 47 against the outer face of the emery-wheel and holds the projecting nibs of the retaining-washer 48 and the pinion 50 in engagement with the notches in the spindle 39, thus making a solid rigid connection between the emery-wheel 40 and the pinion 50, the object of this connection being to provide a spindle for the emery-wheel which would be interchangeable and which would not interfere with the face of the emery-wheel and which would permit of an enormous wear on the same. Another object is to make the wheel reversible when one face is worn.

As aforesaid, the base 1 is cut away above the arms 8 in order to allow the rim 13 of the mower-wheel to pass over the arms 8. The oblique wall 10 of the base 1 is of such a length that it rests upon the tread of the mower-wheel. The catch 53 is caught under the opposite side of the rim, and the cam-wrench lever 54 tightens the catch 53 and holds the grinder securely to the wheel.

Having thus specifically described the several parts of my invention, its operation is as follows: When the grinder is secured to the mower wheel or bench, as described, the knife is inserted in the holder, the head being held in the left hand, and as the holder works on a swivel-plate it can be thrown to any position along the arrows in Fig. 2. The standard carrying the emery-wheel being pivoted to the base can also be thrown in any position, as shown in dotted lines in Fig. 1, and securely held by means of the cam-lever 42. Thus any section of the knife or any part of a section can be easily and quickly ground. Fig. 2 shows a section being ground on the side nearest the head. By throwing the holder on the outside on the emery-wheel and slanting the knife in the opposite direction, as shown in dotted lines, the sections are ground on the other edge. It is thus obvious that any position can be thus obtained and the last section nearest the head can be as easily and as quickly ground as the central or intermediate sections.

Having thus described the operations of my invention, I do not wish to be understood as limiting myself to the exact construction herein set forth, as I consider myself entitled to any changes or modifications made therein which fall within the limit and scope of my invention, and

What I claim as new, and desire to secure by Letters Patent of the United States, is—

1. In a mower-knife grinder, the combination of the base forming the bed-plate, the split standard pivoted thereto, the swivel-plate mounted thereon, and the adjustable knife-holder, substantially as described.

2. In a mower-knife grinder, the combination of the base, the vertical side or wall formed thereon, the arced or segmental flange formed on said wall, the split standard, a bolt and cam carried thereby, said bolt engaging said flange, and a grinding-wheel, substantially as described.

3. In a mower-knife grinder, the combination of the base, a vertical wall or side formed thereon, and having an opening in its face, a split standard-arm secured in said opening, said standard-arm forming a bearing on its lower end for the gear-wheel, and a journal for the shaft of the grinding-wheel, and a grinding-wheel, substantially as described.

4. In a mower-knife grinder, the combination of the base, the arms 8, the vertical side or wall formed on said base, the split standard carried therein, the oblique side formed on said base, provided with a vertical slot, a bolt carried in said slot, a catch carried on said bolt, a cam-wrench lever on said bolt, all arranged in such a manner that the plates 8 are held under the rim of the mower-wheel, the oblique side resting on the tread of the mower-wheel, substantially as described.

5. In a mower-knife grinder, the combination of the base, a bed-plate formed thereon, a swivel-plate carried on said bed-plate, a knife-holder mounted on said swivel-plate, a vertically-adjustable clip carried by said knife-holder, and means for holding said clip in an upright and in adjusted position, substantially as described.

6. In a mower-knife grinder, the combination of the base, split standard-arm mounted therein, a grinding-wheel recessed on both faces, a retaining-washer in the inner recess, nibs in said retaining-washer, a hollow spindle, a pinion, nibs in the inner face of said pinion, and notches in the ends of said spindle, and the securing-bolt, substantially as and for the purposes set forth.

7. The means herein described of grinding mower-knives consisting of the pivoted knife-holder by which either side of the cutting edge of the knife may be applied to the grinding-wheel, in combination with the grinding-wheel, and pivoted split standard, substantially as described.

8. The combination in a machine for grinding mower-knives, consisting of the pivoted swivel-plate, the pivoted knife-holder, the vertically-adjustable clip carried thereby, and means of vertical adjustment on said clip, substantially as described.

9. In a machine for grinding mower-knives, the combination of a base, a split standard pivotally secured thereto, a grinding-wheel, means for securing said standard in any position within its limit of adjustment, substantially as described.

10. The combination in mower-knife-grinding machines of the sectional standard-arm, having a journal and a bearing at each end for the purpose described, the intermediate hollow steel spindle having notches at each end, pinion or washer having recesses or seats to correspond to the ends and to hold the hollow shaft in position, projecting nibs in said recesses to correspond with said notches in the shaft and to fit therein, a securing-bolt passing through the pinion, the hollow spindle and the washer by which all the parts are solidly secured together for joint operation as set forth.

In testimony whereof I affix my signature in presence of two witnesses.

RICHARD G. KENNEDY.

Witnesses:
JOHN F. SWEENY,
ROBT. B. WHITING.